United States Patent Office 2,724,689
Patented Nov. 22, 1955

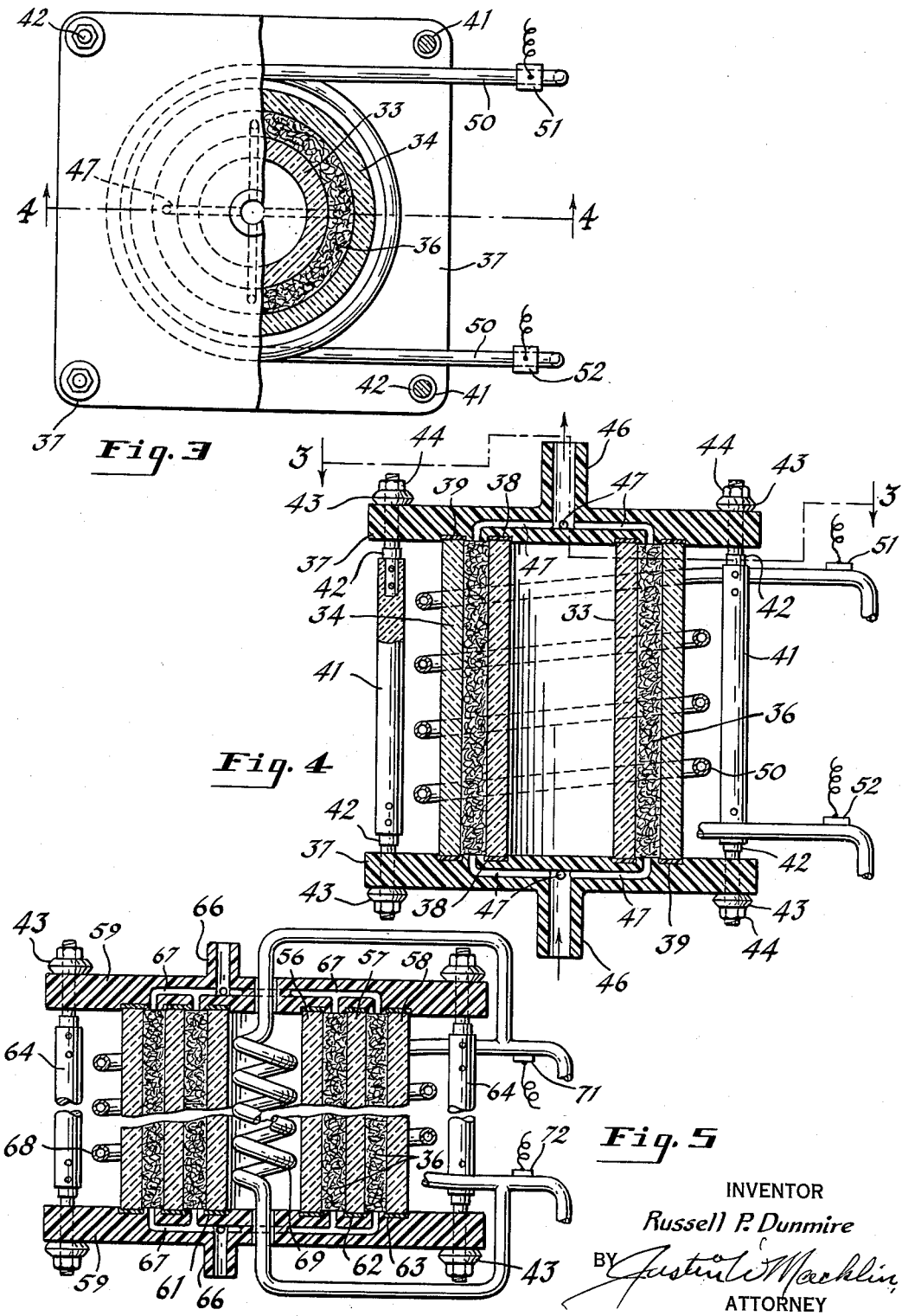

2,724,689

HYDROGENATION OF UNSATURATED FATTY OILS

Russell P. Dunmire, Orange Village, Ohio

Application December 2, 1949, Serial No. 130,698

18 Claims. (Cl. 204—167)

This invention relates to improved methods and apparatus for carrying out catalytic reactions and more particularly to the hydrogenation of unsaturated fatty oils. This application is intended as a continuation-in-part of my prior application, Ser. No. 519,572, filed January 24, 1944, now abandoned, for "Process of and Apparatus for Carrying Out Chemical Reactions."

In general, the hydrogenation of unsaturated fatty oils has been effected in the past by passing hydrogen gas through an oil while the oil is held in a suitable container in contact with a hydrogenation catalyst and while maintaining the oil and the catalyst at an elevated temperature. The temperature may range from as low as about 120° F. to above 400° F., depending upon the character of the oil being treated, the pressure employed, the rate and completeness of reaction desired, and other considerations which affect the character of the product.

Hydrogenation processes have been performed commercially both on a batch basis and on a semi-continuous basis, and contact with the catalyst has been achieved either by suspending a powdered catalyst in the oil and subsequently removing it by filtration or by employing a stationary carrier having a large surface area coated with the catalyst material. These processes have involved supplying sensible heat to the oil and thence to the surfaces of the catalyst while the oil is maintained in a hydrogen atmosphere under an appreciable superatmospheric pressure.

The degree of hydrogenation and the progress of side reactions that modify the oils in other respects, depend, to a considerable extent, upon the operating conditions such as the temperature and pressure employed, the rate of heat transfer, the rate of molecular contact of reactants and catalyst, the presence of impurities in the oil itself, in the hydrogen gas, or in the hydrogenation reactor, and the time to which the oil is subjected to these variable conditions. The value of the hydrogenated oil for various industrial purposes, therefore, is dependent to a considerable degree, upon the process employed and the precise conditions of operation.

It is a generally accepted fact that the hydrogen must be dissolved in the oil in order for hydrogenation to occur and that the hydrogenation reaction takes place at the interface between the hydrogen-laden oil and the catalyst. Since the solubility of hydrogen in oil increases both with temperature and pressure, it has been considered more or less essential for the oil itself to be maintained at a relatively high temperature to effect any substantial degree of hydrogenation within a reasonable time. However, high temperature tends to promote undesired chemical alteration of unsaturated oils, as by polymerization, interesterification, and decomposition, for example; and the rate of hydrogenation may actually be reduced by the use of temperatures above about 425° F. Thus, there has been a practical limit to the temperature that may be employed, particularly if the oil is to be held at the elevated temperature for a prolonged period of time. This is especially true with respect to edible oils containing vitamins, amino acids, and hormones.

In a batch operation, intimate mixing of the hydrogen with the oil is generally performed while the oil is held at the desired hydrogenation temperature and in the presence of the catalyst. In continuous processes, the oil is first heated and charged with hydrogen to the limit of its solubility at the temperature and pressure employed, and the saturated oil, together with an excess of hydrogen, is run into a reactor and over a stationary catalyst bed. This may be done continuously either by dripping or spraying the oil on the catalyst or by flooding the reactor with oil. Continuously withdrawn oil may be sent to storage, or recirculated for more complete hydrogenation. In any event, the oil is kept at the elevated temperature for a prolonged period of time in order to carry the process to completion.

Insofar as I am aware, the commercial processes for the hydrogenation of unsaturated fatty oils have involved the use of some form of externally generated heat to raise the temperature of the entire oil mass to the selected reaction temperature range and to hold it in that range until hydrogenation is complete.

A primary object of the invention is to provide a process and appaartus for hydrogenating fatty oils without heating the oils prior to the actual hydrogenation step and while maintaining the mean oil temperature at a minimum.

A further object of the invention is to provide a process and apparatus for hydrogenating fatty oils at a more rapid rate than has heretofore been possible without employing objectionably high temperatures.

A further object of the invention is to provide a process and apparatus for hydrogenating fatty oils with closer control of the degree of hydrogenation and of the occurrence and progress of side reactions tending to modify the oils in other respects.

Still another object of the invention is to improve the thermal efficiency of processes for hydrogenation of fatty oils by keeping to a minimum the amount of sensible heat supplied to the oil in the course of the process, thus reducing heat losses as well as the high temperatures inherent in present commercial practices.

A characteristic feature of the invention involves elimination of the necessity for heating the oil for dissolving hydrogen therein. Another feature of the invention is that the energy required to effect the endothermic hydrogenation reaction is supplied directly to the catalyst, rather than directly to the oil.

Other objects and advantages of the invention will become apparent from the following detailed description of various embodiments thereof and of examples of the application of the invention to the hydrogenation of specific oils.

The invention will first be described with reference to the accompanying drawings in which:

Fig. 3 is a top view of one of the reactors shown in Fig. 1; the reactor being shown partly in section as indicated by the line 3—3 in Fig. 4;

Fig. 4 is a vertical sectional view of the reactor of Fig. 3, the plane of the section being indicated by the line 4—4 in Fig. 3; and Fig. 5 is a vertical sectional view similar to Fig. 4 but showing a modified form of reactor.

Figures 1, 2:
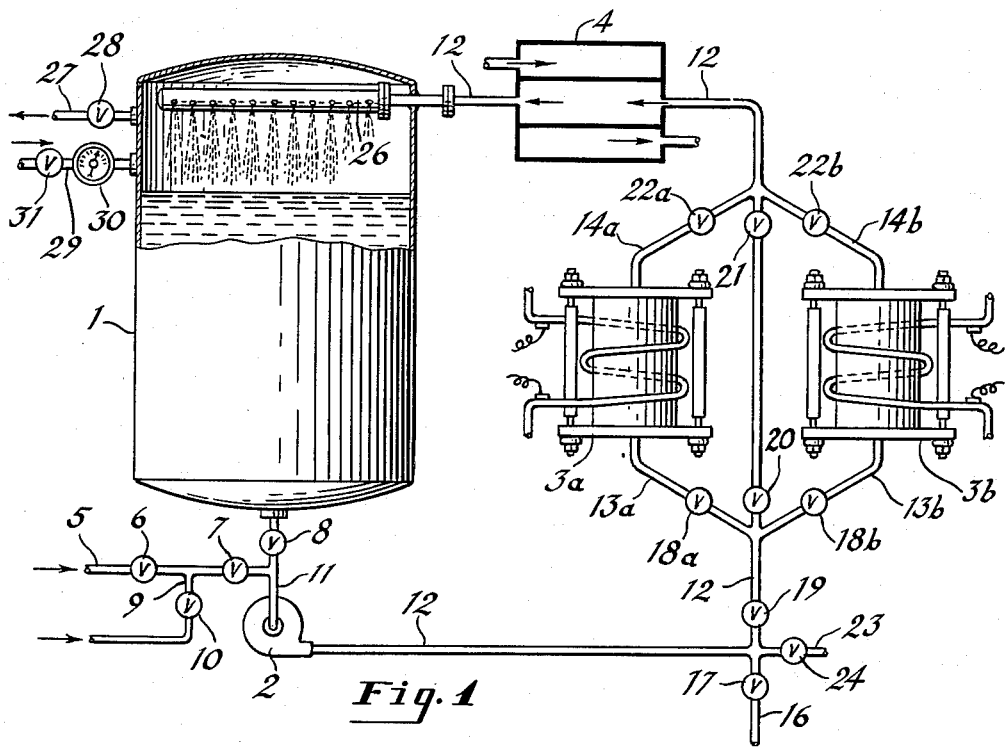
Figure 1 is an elevational view of one form of apparatus for carrying out the invention on a batch basis, some of the details of the apparatus being shown somewhat schematically.
Fig. 2 is an elevational view similar to Fig. 1, showing a modified form of a portion of the apparatus for carrying out the invention on a continuous or semi-continuous basis.

Referring to Fig. 1 of the drawings, there is shown, in a more or less schematic form, an arrangement of apparatus for carrying out the invention on a batch basis. The apparatus includes a pressure tank 1, a centrifugal pump 2, a pair of identical reactors 3a and 3b which are adapted for alternate or simultaneous use as hereinafter described, and a cooler or heat exchanger 4.

The pressure tank 1 is adapted to receive oil to be hydrogenated through a pipe 5 that leads upwardly through the bottom of the pressure tank and is provided with three spaced valves 6, 7, and 8. A connecting pipe 9, equipped with a valve 10 for admitting hydrogen gas into the system, joins the oil pipe 5 between the first two valves 6 and 7, and another connecting pipe 11 connects the low pressure or inlet side of the pump 2 to the pipe 5 between the second and third valves 7 and 8 for withdrawing a mixture of oil and hydrogen gas from the pressure tank.

The high pressure or outlet side of the pump 2 is connected to a pipe 12 for circulating a mixture of oil and hydrogen gas, either directly through the heat exchanger 4 and back into the upper part of the pressure tank or also through one or both of the reactors 3a and 3b between the pump and the heat exchanger. Oil and gas from the pipe 12 may be by-passed through pipe 13a to the reactor 3a and thence through the pipe 14a and back into the pipe 12 for return to the upper part of the tank 1. Similarly, oil and gas may be by-passed through the pipe 13b, reactor 3b, and pipe 14b. A drain pipe 16 with a valve 17 is also connected to the pipe 12 at a low point in the system for drainage purposes. A number of additional valves 18a, 18b, 19, 20, 21, 22a, and 22b are disposed in the system for controlling the flow therethrough as hereinafter described. (For convenience later in illustrating how the reactor system of Fig. 2 may be used, an additional branch pipe 23 and valve 24 have been included in Fig. 1.)

Where the pipe 12 returns to the upper part of the pressure tank 1, it is connected to a spray head 26 inside the tank for breaking up the returned oil into a fine spray. The atmosphere in the upper part of the tank through which the spray falls is controlled by an exhaust pipe 27, equipped with a valve 28, for exahusting air and water vapor therefrom, and by a pipe 29 equipped with a pressure gage 30 and valve 31, for supplying and maintaining a hydrogen atmosphere in the tank at a selected pressure, as hereinafter described.

The construction of suitable reactors 3a and 3b is shown in detail in Figs. 3 and 4. Each of these illustrative reactors comprises inner and outer, concentric, cylindrical shells 33 and 34 that define an annular reaction chamber therebetween. The shells 33 and 34 may be made of any suitable inert material that is a non-conductor of electricity, such as porcelain, ceramic ware, silica glass, quartz, or the like.

The annular reaction chamber is filled with a self-sustaining porous mass of a suitable, electrically conductive, catalytic material 36, hereinafter described, and the ends of the chamber are closed by a pair of identical heads 37 of a relatively strong, inert, and heat resistant structural material such as Bakelite, polystyrene, or the like, having good dielectric properties. The ends of the cylindrical shells 33 and 34 abut against suitable pairs of inert, impervious, and heat resistant gasket rings 38 and 39, respectively, which may be made of tetrafluorethylene ("Teflon"), a silicone resin, or equivalent material. The gaskets are preferably set into the heads 37 as shown.

The heads 37 are yieldably held against the ends of the cylinders 33 and 34, preferably by insulating tie rods 41. These rods may be formed of any good dielectric material having considerable structural strength, such as Mycalex, Pyrex glass, etc., and having threaded studs 42 secured to their opposite ends. The studs 42 project through apertures in the heads 37 a sufficient distance to receive any suitable spring washers 43 and nuts 44 for holding the assembly together with sufficient resilience to accommodate slight, longitudinal, thermal expansion and contraction of the cylindrical shells 33 and 34. Each of the heads 37 is formed with a hollow, centrally disposed boss 46 forming a conduit that communicates with the reaction chamber through a number of radially arranged passages 47. A supply pipe, such as 13a (Fig. 1), is connected to the boss 46 at one end of the reactor, and a discharge pipe, such as 14a, is connected to the boss 46 at the other end of the reactor.

An electrical conductor 50, preferably in the form of a copper tube, surrounds the outer cylindrical shell 34 in the form of a coil of several turns that may be substantially coextensive with the reaction chamber in an axial direction. The ends of the conductor are provided with electrical terminals 51 and 52, to which leads from a suitable source of high frequency alternating current are connected. Thus, passage of a high frequency current through the conductor 50 creates an electromagnetic field that induces a current of the same frequency in the electrically conductive catalytic material 36 in the reaction chamber. A suitable cooling medium may be circulated through the tubular conductor from any convenient source (not shown).

Referring to the modified form of reactor shown in Fig. 5, the capacity of the reactor may be enlarged without substantially altering its operation by employing three concentrically arranged cylindrical shells 56, 57, and 58 of a suitable insert, dielectric material. The three shells form two concentric annular chambers that may be filled with any suitable oil pervious mass of catalyst, such as the catalytic material 36 employed in the reactor shown in Figs. 3 and 4. The ends of these annular chambers are closed by a pair of identical heads 59 of the same material as the heads 37 in Figs. 3 and 4. The ends of the cylindrical shells are abutted against suitable pairs of gasket rings 61, 62, and 63, respectively, which are set into the heads of the reactor as shown. The reactor is held together in the same manner as the reactor of Figs. 3 and 4 by suitable tie rods 64 yieldably anchored at their opposite ends in the heads 59 of the reactor. Hollow bosses 66 are preferably formed off center on the heads 59 in this instance. The hollow bosses are connected to both of the annular reaction chambers by a number of passages 67, shown formed in the heads 59, and the bosses are respectively connected to supply and exhaust pipes, such as 13a and 14a (Fig. 1) for conveying hydrogen-laden oil to and from the reactor.

For more efficient induction heating, the single conductor 50 employed in the reactor of Figs. 3 and 4 is replaced in this instance by an external coil 68 and an internal coil 69 connected in parallel and provided with terminals 71 and 72 for connection to leads from a suitable source of high frequency alternating current. The external coil surrounds the reactor in substantially the same manner as the conductor 50 surrounds the reactor of Figs. 3 and 4. The internal coil 69, however, has its ends extended axially through the heads of the reactor in opposite directions and thence outwardly and into communication with the ends of the external coil 68. By employing both internal and external coils in this manner a more uniform magnetic field may be induced throughout both of the two concentrically arranged reaction chambers. In other respects the reactor of Fig. 5 is substantially the same in construction and mode of operation as the reactor of Figs. 3 and 4.

For the purpose of the present invention, I prefer to employ an alternating current in the range from about 1,000,000 to 2,000,000 cycles (1 to 2 megacycles) per second, to obtain the most satisfactory results within the efficient range of presently available power supply equipment. Lower frequencies down to about 500,000 cycles per second may be employed with satisfactory results if desired, but the speed of the hydrogenation reaction, or degree of hydrogenation during a given time of contact with the catalyst, drops off as the frequency drops. Except for the limits imposed by available power equipment, frequencies greatly in excess of 2,000,000 cycles per second could be employed. Up to as high as 10 megacycles the efficiency of the hydrogenation reaction appears to improve as the frequency is increased, though the electrical losses also increase. Thus, still higher frequencies may become economically practical as improvements are made in power supply equipment, and I do not wish to be limited to any particular maximum frequency.

The mode of operation of the apparatus of Fig. 1 for hydrogenating any of the unsaturated fatty oils is basically the same. Starting with the system empty and all of the valves closed, the operation is preferably as follows: The valve 28 in the exhaust pipe 27, the valves 19, 20, and 21 in the circulator pipe 12, and the valves 6, 7, and 8 in the oil supply pipe 5 are all opened so that air in the system may escape and so that the pipes 11 and 12, as well as the tank 1, may be filled with oil to the desired level. Oil at room temperature is supplied to the system through the pipe 5 under the required pressure to fill the tank 1 to approximately the level shown in Fig. 1. The valve 6 in the pipe 5 is then closed, vacuum is applied to the exhaust pipe 27, and the pump 2 is started for circulating the oil from the bottom of the pressure tank, through the pipe 11 and pipe 12, and back into the upper part of the tank through the spray head 26, from which the oil is discharged as a fine spray. This circulation is continued until the oil has had as much of its original content of water and dissolved gases removed as possible.

After dehydration and degasification of the oil, as described, the exhaust valve 28 is closed and hydrogen gas under a pressure of about 12 to 20 lbs. per sq. in. is introduced into the pressure tank through the pipe 29 while continuing the circulation of oil by means of the pump 2. This condition is maintained until the oil has dissolved as much hydrogen gas as possible, substantially complete saturation at the prevailing temperature and pressure being insured by the constant spray of oil issuing from the spray head 26 into a hydrogen atmosphere and the continuous recirculation maintained by the pump 2.

The valves 20 and 21 in the pipe 12 are then closed, and the valves 18a and 22a are simultaneously opened to by-pass all of the oil through the reactor 3a. At the same time, the high frequency current is applied to the terminals of the conductor surrounding the reactor 3a to heat the catalyst therein by induction. Then the valve 10 in the hydrogen supply pipe 9 is "cracked" partly open while supplying additional hydrogen through the pipe 9 at a pressure about 3 to 5 lbs. per sq. in. above that prevailing at the gage 30 to insure a constant bleeding of hydrogen gas into the pipe 11 and thence through the pump 2 and into the pipe 12. The amount of additional hydrogen, and thus the pressure in the pipe 9, may be varied as desired in accordance with the type of oil being processed, the solubility of hydrogen gas in the oil, and the number of double bonds to be satisfied during hydrogenation. Thus, a supply of hydrogen in excess of that which the oil will dissolve at the ambient temperature is intimately dispersed in the oil by the action of the pump 2, and oil that is thus supersaturated with hydrogen gas is passed through the reactor 3a and into intimate contact with the inductively heated catalyst therein.

The magnitude of the high frequency current supplied to the reactor is adjusted so that the oil emerging through the pipe 14a reaches a selected maximum temperature. As the heated oil is returned to the pressure tank, it passes through the heat exchanger 4, which may be supplied with a suitable coolant for reducing the temperature of the oil down approximately to the starting temperature. In this manner, the temperature of the oil both when entering and leaving the reactor is maintained substantially uniform for as long as it may be necessary to continue the reaction.

The chemical combination of hydrogen and oil in the reactor permits the oil leaving the reactor to dissolve more hydrogen gas. Upon being returned to the tank 1, this oil is again sprayed through an atmosphere of hydrogen and is subsequently mixed with additional hydrogen in the pump 2, whereby supersaturation of the oil entering the reactor and an ample supply of hydrogen for the hydrogenation reaction taking place therein are insured.

When substantially complete hydrogenation of the oil has been achieved, there is no longer any absorption of heat by the endothermic reaction, and the heat induced in the catalyst can only be transferred to the oil as sensible heat. Thus, completion of the reaction is evidenced by a sudden increase in the temperature of the oil leaving the reactor. This is a convenient indication of completion of the reaction, and care should normally be taken to stop the supply of high frequency current to the reactor promptly when this point is reached.

By selecting the proper current intensity, rate of flow of oil, etc., substantially complete hydrogenation of most oils may be achieved without permitting the temperature of the oil leaving the reactor to exceed 125° F.

The effects of changing various conditions of operation may be stated in general terms as a guide in the selection of appropriate conditions of operation for a given piece of apparatus. A change in the magnitude of the electrical current or in the temperature of the oil entering the reactor produces a corresponding change in the temperature of the oil leaving the reactor, in the rate of hydrogenation, and in the progress of side reactions, though the changes are not necessarily proportional. A change in the frequency of the electrical current or in the pressure employed, while maintaining the other operating conditions the same, produces a corresponding change in the rate of hydrogenation without substantially affecting the temperature rise of the oil passing through the reactor or the progress of side reactions. A change in the rate of flow of the oil through the reactor produces an opposite change in the mean temperature rise of the oil during passage through the reactor and in the degree of hydrogenation resulting from a single pass of the oil through the reactor. A change in the degree of supersaturation of the oil with hydrogen gas before introducing it into the reactor produces a corresponding, but less pronounced, change in the rate of hydrogenation and an opposite change in the life of the catalyst before regeneration is required.

When the reaction has progressed to the desired degree (as determined by the refractive index of samples taken, for example), the current supply to the reactor is cut off and the hydrogen supply valve 10 in the pipe 9 is closed. The oil may then be degasified to remove all dissolved hydrogen and any slight amount of volatile decomposition products that may have formed during the hydrogenation reaction, and may then be saturated with any suitable inert gas, such as nitrogen. Such a procedure produces a bland oil by removing volatile decomposition products and renders the oil less susceptible to subsequent infusion of oxygen from the air, thus retarding subsequent natural decomposition during storage or use. This is desirable for many uses to which hydrogenated oils are put. It is generally essential when producing an edible oil, particularly if the oil is to be used as a vehicle for vitamins, hormones, and other food supplements that are highly susceptible to oxidation and consequent deterioration.

Such degasification and subsequent saturation with an inert gas may readily be accomplished in the apparatus of Fig. 1 by first closing the valve 31 in the hydrogen supply pipe 29, opening the valve 28 in the exhaust line 27, and applying a vacuum to the exhaust line while still circulating the oil by means of the pump 2. When degasification is complete, the valve 28 is again closed, the valve 31 is opened, and the inert gas is supplied under pressure through the pipe 29 to the oil as circulation thereof is continued. When saturation with the inert gas has been accomplished, the supply of nitrogen is continued as the system is drained through the pipe 16.

Up to this point, no use for the second reactor 3b has been indicated. As is obvious from its parallel relation with the reactor 3a, both reactors may be used simultaneously to increase the rate of hydrogenation, and any number of reactors in parallel may be similarly employed. Alternatively, and preferably, the reactor 3b is employed as a standby for use when the catalyst in the reactor 3a requires reactivation, thus permitting the system to remain in use while one reactor is being serviced, as is required from time to time.

The catalyst employed in the reactors may be any electrically conductive hydrogenation catalyst, though nickel is the best for most purposes and is by far the most widely used in commercial processes for hydrogenating fatty oil. I prefer to use what is best described as nickel wool, the individual fibers being of the general order of two to five thousandths of an inch in diameter. This material is economical to produce by the same methods used for the production of the ordinary steel wool of commerce. It is highly pervious to the flow of oil therethrough, drains readily, is easily handled, conforms to the contours of any shape and size of reaction chamber, and is self-sustaining in the sense that it will not collapse, pack, or be carried away by the oil flowing through the reactor and require removal by filtration. Of equal importance, it has a large surface area for the volume it occupies, which is essential for obtaining an ample oil-catalyst contact area.

While nickel wool is an ideal catalyst for use in the present invention, it is obvious that other hydrogenation catalysts and other forms of nickel catalyst may be employed. Any finely divided electrically conductive hydrogenation catalyst, such as platinum, held in the reactor by being admixed with a conventional adsorbent support, such as fuller's earth, can be employed. Also, coatings of an electrically conductive hydrogenation catalyst on the surfaces within any self-sustaining porous mass, or upon the particles of any granular or fibrous, non-packing carrier may be employed. Since the chemical reaction, the catalytic function, and the many equivalent types of catalysts for performing that function are well known in the art, I do not intend the invention to be limited to the particular type of catalyst disclosed, except as required by the appended claims.

When a conductor is disposed in an alternating electro-magnetic field, a current of the same frequency is induced in the conductor, and the flow of current in the conductor necessarily heats the conductor at a rate dependent on the magnitude and frequency of the current and on the resistance of the conductor. With relatively low frequencies, the entire body of the conductor seems to be heated. The higher the frequency, the more the heating effect is confined to the surface of the conductor (a phenomenon known as the "skin effect"), the depth of the heating being stated to vary inversely with the square of the frequency, and the surface temperature reached being stated to increase with the frequency and at a rate dependent upon the rate of heat dissipation.

The catalyst 36, being a conductor, and being subjected to an alternating electro-magnetic field of relatively high frequency, is thus directly heated at its surface. Since the hydrogen-laden oil is in contact with the heated catalyst surface and the hydrogenation reaction takes place principally, if not entirely, at the oil-catalyst interface, it is apparent that the process of the invention supplies the heat directly to the most critical reaction zone. Thus, while the temperature at that zone may be high, only the molecules of oil immediately in that zone reach the reaction zone temperature. Because the oil is in more or less turbulent motion, by reason of the intricate maze of paths of flow through the porous catalyst mass, the velocity of the oil over the catalyst surfaces is quite high, and the dissipation of heat from the catalyst throughout the surrounding oil is rapid and efficient. Also, since the hydrogenation reaction is endothermic, much of the heat dissipated in the reactor is apparently consumed by the reaction and never appears as sensible heat. While the oil immediately adjacent a catalyst surface may reach a momentary maximum temperature that is relatively high, no part of the oil remains long at that high temperature and the mean temperature of the oil mass in the reactor at a given moment is apparently substantially below the maximum. For these reasons, it is believed, an effective hydrogenation temperature (at the oil-catalyst interfaces) is obtained that is very considerably higher than the mean temperature of the oil.

Compared to the prior art processes in which the required hydrogenation temperature is achieved by heating the entire oil mass to that temperature, two outstanding advantages of the present invention thus become apparent, namely, (a) greatly increased overall thermal efficiency and (b) avoidance of the numerous deleterious effects of holding the oil at a high temperature for any appreciable period of time.

A further advantage of the process is that the catalyst remains active over exceedingly long periods of time without regeneration, compared to the performance of the same catalytic materials in conventional prior art processes. The inductively heated catalyst is seemingly far less susceptible to catalyst poisons under the conditions of operation. As a result, the costs of operation are reduced by eliminating much of the catalyst regeneration time formerly required.

Because it is impossible to measure the temperature reached by the oil in the alternating electrical field, due to the effect of the field upon any temperature measuring instrument placed therein, some of the foregoing theory of operation is somewhat conjectural, and I do not wish to be limited by any theory of operation. Moreover, there is evidence that the full explanation of the operation of my method and apparatus involves still more abstruse phenomena than those explained in the foregoing discussion. Based upon the known effects of temperature upon the rate of the hydrogenation reaction, and estimates of the maximum temperature obtainable at the oil catalyst interface with a given mean temperature of the oil emerging from the reactor, the rate of hydrogenation far exceeds what could reasonably be expected. I attribute this to some unknown, or at least unexplained, effect of accelerated molecular activity at the oil-catalyst interface due to the high frequency current traveling in that reaction zone. It seems probable that far greater molecular activity is brought about in the reaction zone than could result from heat alone.

The magnitude of the current that should be applied to the conductor 50, or the strength of the magnetic field that should be created thereby, in order to achieve a particular result, must be determined empirically for a particular form of reactor and set of operating conditions, and even approximate limits cannot readily be given to define the practical conditions of operation. The reason for this is that such figures are subject to wide variation with changes in the many other variables in the system, such as the physical character of the catalyst, the rate of movement of the oil over the catalyst surface, the starting temperature of the oil, the selected maximum temperature of oil leaving the reactor, the amount of dissolved and dispersed hydrogen in the oil, the type of oil, etc., to say nothing of the electrical efficiency of the reactor as an induction heater. Similarly, it is impossible, or at least highly impractical, to specify the practical limits upon changes in the other variables mentioned. However, the more important conditions of operation that have been employed with success in a given system of the character herein described will be useful to illustrate more fully the practice of this invention and for comparison with other methods and systems.

The apparatus of Figs. 1, 3, and 4, but with the cooler 4 omitted, was employed to hydrogenate certain specific oils selected for illustrative purposes. The reaction chamber of the reactors 3a and 3b had an inner diameter of 4 inches and outer diameter of 5 inches, and a length of 18 inches. The catalyst employed was nickel wool having fibers ranging from .002 to .004 of an inch in diameter loosely packed to fill the reaction chamber. The input electrical energy was 2,000 watts at 1.5 megacycles. A refined soya bean oil and a refined fish oil were processed successively in this apparatus and the same soya bean oil was processed in conventional equipment for comparative purposes.

The conventional hydrogenation process was carried out by suspending a finely divided catalyst in the oil contained in an autoclave, the catalyst being nickel deposited on kieselguhr. The autoclave was provided with a steam jacket for heating and with a high speed agitator, and an atmosphere of hydrogen gas was maintained above the oil. Hydrogen gas was continuously bled from the top of the autoclave and reintroduced into the bottom of the autoclave so as to bubble upwardly through the oil.

In the following table the conditions of operation and the results of the runs on the hydrogenation of the soya bean oil and the fish oil by my high frequency induction method are given in the first two columns of data, and the conditions of operation and results obtained by the conventional hydrogenation process are given in the third column of data. In each case, initial degassification was carried out for 20 minutes at 29.95 inches of mercury vacuum.

|  | High Frequency | Induction Method | Conventional Method |
| --- | --- | --- | --- |
| Type of Oil | Soya Bean | Fish Oil | Soya Bean. |
| Starting Temp | 71° F | 68° F | 66° F. |
| Hydrogen Press | 10 #/sq. in | 10 #/sq. in | 100 #/sq. in. |
| Oil Press | 10 #/sq. in | 10 #/sq. in | 100 #/sq. in. |
| Vol. of charge | 5 gal | 5 gal | 5 gal. |
| Rate of circulation | 50 gal./hr | 50 gal./hr | high speed agitation. |
| Reaction time | 29 min | 35 min | 210 min. |
| Final Temp | 160° F | 160° F | 350° F. |
| Final Titre | 67.2° C | 52.8° C | 63-65° C. |
| Final free fatty acids | 1.93% | 3.20% | 2.00%. |
| Final iodine value | 3.02 | 5.91 | 2.96. |
| Final sap. number | 193 | 189 | 191. |

In the above described experiments, the total amount of heat energy supplied when using the high frequency induction method was approximately 50% less than that supplied when using the conventional process.

Turning now to the apparatus in Fig. 2 of the drawing, there is shown a variation of the reactor arrangement for hydrogenating oil on a continuous or semi-continuous basis, rather than on the batch basis described above.

The apparatus of Fig. 1, with the reactors, the pipes for connecting them to the circulating pipe 12, and the heat exchanger 4 completely eliminated, may be used to supersaturate the oil with hydrogen gas, as previously described. When saturation of the oil with hydrogen gas is complete, the valve 19 in the pipe 12 is closed and the valve 24 in the branch pipe 23 is opened to discharge the hydrogen-laden oil through the pipe 23 and into the reactor arrangement shown in Fig. 2, from which the fully hydrogenated oil is discharged for such subsequent treatment as may be desired.

Referring to the details of Fig. 2, there is shown one bank of reactors 81a, 82a, and 83a, and a second bank of reactors, 81b, 82b, and 83b, the two banks being adapted either for alternate use or simultaneous use as desired. Between each adjacent pair of reactors in a bank, is a cooler or heat exchanger, such as 84, which may be supplied with any suitable coolant. The two banks of reactors and coolers are connected in parallel to the pipe 23 by means of branch pipes 86a and 86b, respectively, and the reactors and coolers in each bank are connected in series to form a continuous path therethrough. The terminal reactors 83a and 83b in the two banks exhaust into branch pipes 87a and 87b, respectively, and these branch pipes are connected to a common pipe 88 from which the hydrogenated oil is finally discharged. Suitable valves are located in the various pipes as indicated.

It is obvious, of course, that the oil discharged from the pipe 88 may require further cooling, degassification, saturation with an inert gas, etc., according to the use to which it is to be put. Any suitable equipment (not shown) may be connected to the pipe 88 for such purposes.

Each of the reactors 81a, 82a, 83a, 81b, 82b, and 83b may be identical with the form of reactor shown in Figs. 3 and 4, or the form of reactor shown in Fig. 5 may be substituted therefor. The coolers between adjacent reactors may be of any desired type for using the most conveniently available cooling medium.

When a given degree of hydrogenation is desired while employing the system shown in Fig. 1, the reaction time required may be equivalent to complete circulation of the oil, for example, twice through a single reactor. By employing several reactors in series, as in Fig. 2, and cooling the oil leaving one reactor before it enters the next reactor, the same degree of hydrogenation of any given oil may be achieved at the same maximum mean temperature in the time required to empty the tank 1 once at the same pumping rate. It is apparent, therefore, that the reactor arrangement of Fig. 2 may reduce the time required to hydrogenate an oil by as much as 50% or more, depending primarily upon the degree of hydrogenation desired.

I prefer to have at least three reactors in series to give reasonable flexibility for effecting any desired degree of hydrogenation of any kind of fatty oil which may be processed from time to time. There is little resistance to the flow of oil through the reactors, and any excessive capacity due to the number of reactors in a bank may easily be corrected merely by cutting off the electrical current to one or more reactors in the series and cutting off the supply of coolant to any cooler not required, or by reducing the input of electrical energy to one or more of the reactors.

In other respects, the operation of the arrangement of reactors of Fig. 2 is essentially the same as the arrangement in Fig. 1. In fact, if desired, the reactor arrangement of Fig. 2 may be substituted in the system of Fig. 1, thereby reducing the time of circulation of oil during the hydrogenation operation without otherwise altering the general procedure or arrangement of the apparatus.

From the foregoing, it will be seen that I have provided a method and apparatus having a number of outstanding advantages for hydrogenating fatty oils. These advantages are manifested in economy of power, greater speed and completeness of the reaction, controllability of the reaction, and of side reactions, improved quality of the product, and unusual flexibility to meet all of the requirements for handling different kinds of oils.

In addition, the same apparatus, and particularly the reactors themselves, are admirably adapted for carrying out numerous other types of catalytic reactions in which contact between one or more fluid reactants and a catalyst at an elevated temperature is required. While the specific process disclosed herein is one requiring a careful limitation of the maximum temperature of the fluid reactants, the apparatus is well suited also for operations requiring much higher temperatures, and higher pressures as well. Therefore, though a specific reaction and method have been described in detail and are defined in some of the appended claims, certain aspects of the invention are not limited to such details except as expressly required by the claims.

Having described my invention, I claim:

1. The method of hydrogenating unsaturated fatty oil, comprising first saturating the oil with dissolved hydrogen gas and thereafter passing the hydrogen-laden oil over the surfaces of electrically-conductive hydrogenation catalyst in the form of minute metal fibers, and simultaneously activating and accelerating movement of electrons at the interface between the oil and catalyst surfaces by inducing in the surfaces of the catalyst a high frequency electric alternating current in the order of one million cycles per second and upward, the magnitude of induced current being adjusted to produce a mean temperature rise of the oil in the range of approximately 20 to 220 degrees F.

2. The method of hydrogenating an unsaturated fatty oil, comprising first saturating the oil with dissolved hydrogen gas and thereafter passing the hydrogen-laden oil over the surface of an electrically conductive hydrogenation catalyst while inducing in the catalyst a high frequency alternative current of at least 1,000,000 cycles per second, the magnitude of the induced current being adjusted to produce a mean temperature rise of the oil of from about 20 to about 220 degrees F., the initial temperature of the oil being controlled as required as it is recirculated to limit the mean temperature of oil leaving the catalyst to a maximum of about 300° F.

3. The method of claim 2 in which additional hydrogen gas is uniformly dispersed in the hydrogen-laden oil and passed over the catalyst surface therewith.

4. The method of claim 2 in which the magnitude of the induced current is adjusted to produce a mean temperature rise of the oil during passage over the catalyst surface of from about 20 to about 100 degrees F., the input temperature of the oil being controlled as required to limit the mean temperature of the oil leaving the catalyst to a maximum of about 180° F.

5. The method of claim 2 in which the catalyst is a confined mass of nickel wool, the fibers of the wool having an average diameter in the range of about 2 to 5 thousandths of an inch, and the hydrogen-laden oil is passed through the catalyst mass.

6. The method of hydrogenating an unsaturated fatty oil, comprising passing the oil previously saturated with dissolved hydrogen gas and previously admixed with uniformly dispersed undissolved hydrogen gas through a substantially stationary mass of a metallic hydrogenation catalyst while inducing in the catalyst a high frequency alternating current of at least 500,000 cycles per second, the magnitude of the induced current being adjusted to produce a mean temperature rise of the oil during passage through the catalyst mass of from about 20 to about 220 degrees F., and the input temperature of the oil being controlled as required to limit the temperature of the oil withdrawn from the catalyst mass to a maximum of about 300° F.

7. A process for hydrogenating an unsaturated fatty oil, comprising degassifying and dehydrating the oil and saturating it with hydrogen gas while maintaining it at a temperature not substantially exceeding 100° F., then passing a stream of the saturated oil admixed with undissolved hydrogen gas through a substantially stationary mass of a metallic hydrogenation catalyst while inducing in the catalyst a high frequency alternating current of at least 500,000 cycles per second, and adjusting the magnitude of the induced current to a value sufficient to effect hydrogenation of the oil without raising the mean temperature of the oil above 300° F.

8. A process for hydrogenating an unsaturated fatty oil, comprising degassifying and dehydrating a body of the oil and then supersaturating it with hydrogen gas, passing a continuous stream of the hydrogen-laden oil through a bed of an electrically conductive hydrogenation catalyst and thence back into said body of oil while inducing in the catalyst a high frequency alternating current of at least 500,000 cycles per second, said body of oil being maintained at a temperature not substantially exceeding 100° F., and the magnitude of said induced current being adjusted to produce a mean temperature rise of the oil during passage through the catalyst bed of from about 20 to about 100 degrees F., and continuing the flow of said stream until the desired degree of hydrogenation of the oil has been attained.

9. The process of claim 8 in which the flow of said stream is continued until a sharp rise in the temperature of the oil passing from the catalyst bed back to said body of oil indicates that substantially complete hydrogenation of the oil has been achieved.

10. The process of claim 8 in which the hydrogenated oil is again degassified and then saturated with an inert gas.

11. A process for hydrogenating an unsaturated fatty oil, comprising degassifying and dehydrating a body of the oil and saturating it with hydrogen gas at a selected initial temperature, withdrawing from said body of oil a continuous stream of hydrogen-laden oil, introducing additional hydrogen gas into said stream and dispersing it uniformly therein, passing the stream of hydrogen-laden oil through a stationary bed of an electrically conductive hydrogenation catalyst and thence back into said body of oil while inducing in the catalyst a high frequency alternating current of at least 500,000 cycles per second, and maintaining said body of oil at a temperature not substantially exceeding said selected initial temperature, the magnitude of said induced current being adjusted to produce a mean temperature rise of the oil during passage through the catalyst bed of from about 20 to about 100 degrees F., and continuing the flow of said stream until the desired degree of hydrogenation of the oil has been attained, as indicated by a sharp rise in the temperature of the oil passing from the catalyst bed and which corresponds to substantially complete hydrogenation.

12. The process of claim 11 in which the hydrogenated oil is again degassified and then saturated with an inert gas.

13. Apparatus for effecting reaction between a liquid and a gas, comprising means defining an enclosed reservoir, means for charging said reservoir with a liquid reactant, means for evacuating said reservoir, means for supplying a gas reactant to said reservoir at superatmospheric pressure for solution in said liquid, means for withdrawing said liquid and dissolved gas from said reservoir and circulating it along an enclosed path and back into said reservoir, means defining a reaction chamber interposed in said path so that the liquid flows therethrough, a self-sustaining fluid pervious mass of an electrically conductive catalyst disposed in said chamber so that the liquid and dissolved gas pass through said mass, and means for inducing a high frequency alternating current in said catalyst.

14. The apparatus of claim 13 including means for bleeding additional gas into said enclosed path between the point of withdrawal of liquid and dissolved gas from said reservoir and the entrance to said reactor.

15. The apparatus of claim 13 including means for bleeding additional gas into said enclosed path between the point of withdrawal of liquid and dissolved gas from said reservoir and the entrance to said reactor, and centrifugal means for forcing liquid along said enclosed path, said centrifugal means being interposed in said path between the point at which gas is bled into said path and the entrance to said reactor for promoting uniform dispersion of entrained gas in the liquid.

16. The apparatus of claim 13, including means for removing from the liquid sensible heat supplied thereto in said reactor.

17. Apparatus for effecting chemical reactions comprising a pair of concentrically disposed cylindrical shells of a dielectric material, said shells defining an annular reaction spaced therebetween, a pair of end closures for said annular reaction space, said end closures being formed of a dielectric material, means for yieldably holding said end closures against the opposite ends of said shells to accommodate thermal expansion and contraction of the shells, a plurality of passages connecting said annular reaction space with common fluid passages at each end thereof, a self-sustaining mass of a liquid pervious electrically conductive catalyst substantially filling said annular reaction chamber, an electrical conductor encircling the outer one of said shells as a coaxially disposed coil, and means for passing a high frequency electric current through said conductor.

18. Apparatus for effecting chemical reactions comprising a plurality of reactors arranged in series, each of said reactors comprising walls of dielectric material defining an annular reaction chamber, a self-sustaining mass of an oil pervious electrically conductive, hydrogenation catalyst substantially filling said chamber, inlet passages for conducting a fluid into said chamber at a plurality of circumferentially spaced points at one end thereof, outlet passages, for conducting fluid out of said chamber from a plurality of circumferentially spaced points at the opposite end thereof, an electrical conductor encircling said reactor as a coaxially disposed coil, means for passing a high frequency electric current through said conductor, conduits connecting the outlet of each reactor in the series but the last to the inlet of a succeeding reactor, and means for cooling fluid flowing through said conduits between reactors.

References Cited in the file of this patent
UNITED STATES PATENTS

| | | |
|---|---|---|
| 1,123,962 | Walker | Jan. 5, 1915 |
| 1,124,560 | Utescher | Jan. 12, 1915 |
| 1,181,205 | Arnold | May 2, 1916 |
| 1,472,281 | Page | Oct. 30, 1923 |
| 1,621,143 | Vogel | Mar. 15, 1927 |
| 2,147,177 | Seto et al. | Feb. 14, 1939 |
| 2,257,177 | Luster | Sept. 30, 1941 |
| 2,468,799 | Ziels | May 3, 1949 |